3,288,779
2-CYANOVINYL ESTERS OF ORGANIC CARBOXYLIC ACIDS
John Justin Randall, Somerville, N.J., assignor to American Cyanamid Company, Stamford, Conn., a corporation of Maine
No Drawing. Filed Aug. 22, 1962, Ser. No. 218,510
4 Claims. (Cl. 260—207.1)

This invention relates to the provision of new cyanovinyl esters of carboxylic acids and to a new process of making them. More particularly, this invention relates to the provision of 2-cyanovinyl esters of organic carboxylic acids, said esters having the formula:

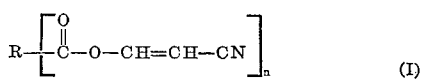
(I)

where $n$ is 1 or 2 and R may be an aliphatic, cycloaliphatic, carbocyclic aromatic or heterocyclic residue.

Compounds of Formula I may be prepared by the novel process of this invention which comprises reacting a 3-haloacrylonitrile (e.g., 3-chloroacrylonitrile) with a carboxylic acid of the formula:

(II)

wherein R and $n$ are as above defined.

Conventional esterification with organic halides is conducted with an alkali metal salt of the carboxylic acid to be esterified, rather than the acid per se. However, in accordance with the present invention, it has been found that use of a specific solvent makes esterification possible without the need of first converting the acid to its alkali metal salt. It is critical in esterifying an acid of Formula II with 3-haloacrylonitrile, that dimethylformamide be employed as the reaction solvent, and a tertiary aliphatic amine be employed as an acid binder (i.e., to take up the hydrogen halide formed during the reaction).

It is surprising that this reaction proceeds at all, let alone with high conversion rates, since attempts with other solvents conventionally used in place of dimethylformamide are relatively unsuccessful as measured by yield of product or minimum reaction times. Thus, for example, when ether is employed as solvent, either an ester is not obtained or, at best, is obtained after a very long reaction time in only insignificant yield. Toluene and even dioxane are similarly undesirable solvents for this reaction.

In conducting the esterification reaction of the present invention, solvent, acid binder, and reactants may be mixed in any desired order. Preferably, the 3-haloacrylonitrile and carboxylic acid are added to a mixture of the dimethylformamide with the acid binder. Some cooling may be desirable since, in some cases, reaction is exothermic, and, at higher temperatures 3-haloacrylonitrile tends to react with the acid binder. This side reaction can be controlled by keeping the temperature below about 60° C., or substantially avoided by maintaining the temperature below about 50° C.

Useful proportions of reactants, acid binder and dimethylformamide vary over a wide range, and, generally speaking, are not critical. One mole of 3-haloacrylonitrile is required to esterify each carboxyl group, and, therefore, if the acid is a mono-basic acid, the effective mole ratio of the former to the latter should be at least 1:1. If dibasic acid is to be reacted, the effective mole ratio should be at least 2:1. However, an excess of 3-haloacrylonitrile, say 3, 4 or even 5 moles, may be employed for each mole of acid. For each carboxyl group which is esterified, one mole of hydrogen halide is formed, and, thus, it is desirable to have present in the reaction mixture at least one mole of acid binder for each equivalent of the carboxylic acid. An excess (e.g., up to about five moles) of acid binder may be employed without deleterious effect.

Useful dimethylformamide concentrations may be expressed in terms of the 3-haloacrylonitrile content of the reaction mixture. In general, at least about one part by volume of dimethylformamide should be used for each part of the nitrile. In actual practice, use of about 3 to 10 parts by volume of dimethylformamide gives improved results. However, even more may be employed if desired, the only disadvantage in so doing, being the resultant difficulty in isolation of the product from the highly diluted reaction mixture.

The ester product may be easily isolated from the reaction mixture. As a first step toward this end, it is desirable to separate the insoluble salt formed during the reaction. This may be accomplished by filtration. The filtrate, containing the product, may be diluted with water, toluene or the like, thereby causing the product to separate as a solid precipitate or oily water-insoluble layer. It may be collected and then purified by conventional means.

Any monobasic or dibasic carboxylic acids may be esterified either by the conventional method or by the above-described process to yield a compound or Formula I. Among those which may be named are the following:

(A) Aliphatic acids such as the alkanoic acids (e.g., acetic, propionic, butyric and stearic acids), alkenoic acids (e.g., oleic, linolenic and linoleic acids), and aralkanoic acids (e.g., the monocyclic lower aralkanoic acids including phenylacetic acid);

(B) Carbocyclic non-aromatic acids such as the five and six-membered cycloalkanoic acids including cyclohexane carboxylic acid and cyclopentane carboxylic acid;

(C) Carbocyclic aromatic acids such as the monobasic and dibasic carboxylic acids having less than four 6-membered rings, e.g., 2-naphthoic acid, benzoic acid, phthalic acid, p-toluic acid, 1-amino-2-anthraquinone carboxylic acid, p-dimethylaminophenylazobenzoic acid and N-(2-cyanoethyl)-N-methylphenylazobenzoic acid; and (D) Heterocyclic acids such as 1-phenylpyrazolin-5-one-3-carboxylic acid and furoic acid.

The preferred 3-haloacrylonitrile is 3-chloroacrylonitrile, although the reaction yields the same products with 3-bromoacrylonitrile. Any tertiary organic amine may be used as the acid binder including: triethylamine, methyldiethylamine, propyldiethylamine, N-methylpiperidine and triethanolamine.

New compounds of Formula I have a variety of uses. They may be used as starting materials for the preparation of cyanoethyl carboxylates. This involves hydrogenating the olefinic unsaturation present in the cyanovinyl esterifying group. A method by which this can be accomplished is hydrogenation with palladium-on-charcoal catalyst in a Parr apparatus until the theoretical quantity of hydrogen has been absorbed.

Additionally, those compounds which contain an azo, anthraquinone, thiazole, oxazole, pyrazole, xanthene, triarylmethane, phthalocyanine or other colored residue, may be employed as the coloring component in dyestuff and pigment compositions. Thus, esters of Formula I containing an azo moiety may be dyed on cellulosic esters, polyesters and polyamides, using standard dyeing procedures.

The following examples are presented to further illustrate the present invention.

EXAMPLE 1

*2-cyanovinyl ester of acetic acid*

The following reactants are mixed with cooling:

| | Ml. |
|---|---|
| Glacial acetic acid | 10 |
| Triethylamine | 20 |
| 3-chloroacrylonitrile | 10 |
| Dimethylformamide | 50 |

The mixture is allowed to stand for 21 hours. It is then clarified by filtration. The filtrate is diluted with water and extracted with ether. The ether solution, containing the product, is washed with sodium bicarbonate solution, with dilute hydrochloric acid and with water. The washed ether is then distilled. The distillate collected above 87° C. contains the ester product, 2-cyanovinyl acetate.

EXAMPLE 2

*2-cyanovinyl ester of butyric acid*

A mixture of:

| | | |
|---|---|---|
| Butyric acid | grams | 20 |
| 3-chloroacrylonitrile | ml | 20 |
| Triethylamine | ml | 25 |
| Dimethylformamide | ml | 50 | is allowed to stand until the reaction is complete. The product is collected by drowning the reaction mixture in water and extracting the oily layer with 50 ml. of ether. The ether containing the product is washed with bicarbonate solution, dried over sodium sulfate and distilled. That part of the distillate collected above the boiling point of ether and below 100° C. contains the ester product, 2-cyanovinyl butyrate.

EXAMPLE 3

*2-cyanovinyl ester of benzoic acid*

The following is mixed with cooling:

| | | |
|---|---|---|
| Benzoic acid | grams | 10 |
| Triethylamine | ml | 10 |
| 3-chloroacrylonitrile | ml | 10 |
| Dimethylformamide | ml | 50 |

The mixture is kept without temperature control until the reaction is complete. It is filtered to remove the salt which is formed. The filtrate is diluted with water. The ester product, 2-cyanovinyl benzoate, separates and is isolated by filtration and dried.

EXAMPLE 4

*2-cyanovinyl ester of 2-naphthoic acid*

The following are mixed with cooling and stirred until the esterification reaction is complete.

| | | |
|---|---|---|
| 2-naphthoic acid | grams | 40 |
| 3-chloroacrylonitrile | ml | 40 |
| Triethylamine | ml | 30 |
| Dimethylformamide | ml | 150 |

The mixture is filtered through activated carbon. The filtrate is diluted by the gradual addition of ice until no more precipitate of product occurs. The product is isolated by filtration and a refined fraction obtained by extraction with boiling petroleum ether, M.P. 78–83° C. The product may also be recrystallized from hexane.

EXAMPLE 5

*2-cyanovinyl ester of terephthalic acid*

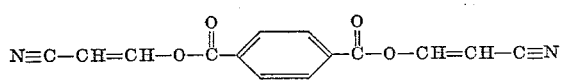

The following are mixed and allowed to stand until the esterification reaction is complete:

| | | |
|---|---|---|
| Terephthalic acid | grams | 10 |
| 3-chloroacrylonitrile | ml | 15 |
| Triethylamine | ml | 20 |
| Dimethylformamide | ml | 100 |

When the reaction is complete, the bis-(2-cyanovinyl)-terephthalate precipitates with the addition of water and is collected and dried.

EXAMPLE 6

*2-cyanovinyl ester of 1-phenylpyrazolin-5-one-3-carboxylic acid*

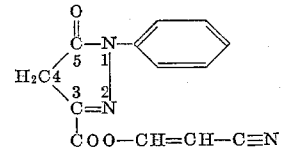

The following are mixed with cooling and allowed to remain without temperature control until the reaction is complete:

| | | |
|---|---|---|
| 1-phenyl-3-carboxy-5-pyrazolone | grams | 10 |
| 3-chloroacrylonitrile | ml | 10 |
| Triethylamine | ml | 10 |
| Dimethylformamide | ml | 50 |

On dilution with water, the product separates and is separated by decantation of the solvent. The product is taken up in hot methanol, the solution filtered and the product is allowed to crystallize. The 2-cyanovinyl 1-phenyl-2-pyrazolin-5-one-3-carboxylate product is collected and dried.

When this product is coupled with diazotized p-nitroaniline, it forms a monoazo dye which dyes polyester fibers a bright yellow hue. The corresponding dye having a free carboxylic acid does not have affinity for polyester fibers.

EXAMPLE 7

*2-cyanovinyl ester of 1-aminoanthraquinone-2-carboxylic acid*

The following compounds are mixed and agitated without temperature control until the esterification reaction is complete.

| | | |
|---|---|---|
| 1-amino-2-carboxyanthraquinone | grams | 8.5 |
| Dimethylformamide | ml | 75 |
| 3-chloroacrylonitrile | ml | 7 |
| Triethylamine | ml | 7 |

The product is filtered, washed with water and dried.

The 2-cyanovinyl 1-aminoanthraquinone-2-carboxylate does not sublime on heating whereas the free-carboxylic acid starting material sublimes readily. Also, there is striking difference in affinity for polyester as described in the following example.

EXAMPLE 8

25 mg. of the dyestuff of Example 7 is mixed with 250 mg. of a nonionic dispersing agent which is a polyoxyethylene ester of mixed fatty and resin acids (of U.S. 2,559,583), and 125 mg. of anionic lauryl sodium sulfate. The mixture is fused. It is then boiled with 25 ml. of water. The resultant dye dispersion is made up to 200 ml. with water. Three grams of a 48% emulsion of methylsalicylate is added. A wet-out 5 gram skein of polyester fiber is added and the skein dyed for one hour at 200° F. It is removed, washed with water and soaped for 10 minutes at the boil in a solution of 0.1% neutral soap and 0.1% soda ash solution. After soaping, the skein is washed with water and dried. Results of dyeing the product of Example 7, and its known free acid, are as follows:

TABLE I

| Dye | Polyester Fiber |
|---|---|
| 2-Cyanovinyl Ester of Example 7 | Scarlet. |
| Carboxylic Acid starting material of Example 7 | Stain (Orange-pink). |

EXAMPLE 9

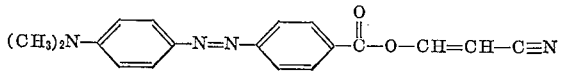

To 100 ml. of dimethylformamide is added 4.2 grams of the monoazo dyestuff p-(4-dimethylaminophenylazo)-benzoic acid, 4 ml. 3-chloroacrylonitrile and 4 ml. of triethylamine. The mixture is allowed to stir without temperature control until esterification is complete. On dilution with water, the product precipitates. It is collected with filtration and dried. It dyes polyesters a bright orange hue and polyamides a bright red-yellow of good fastness to light, sublimation and crocking.

If the above mixture, instead of being diluted with water, is filtered directly to remove part of the product and the rest of the product is separated by the addition of water, stereoisomers are obtained, corresponding to cis and trans configuration within the ester group. Infra-red spectra of the isomers are the same except for a strong splitting of the 9 micron ester band. Further, on dyeing on polyester fiber, the trans isomer appears to be a slightly brighter orange. Color value, exhaustion rate and lightfastness are good and the same for both isomers. The cis isomer is slightly more soluble than the trans isomer.

EXAMPLE 10

25 mg. of each of the isomer dyestuffs of Example 9 is dissolved in 10 ml. of acetone. One drop of a nonionic alkyl aryl polyether alcohol dispersing agent is added and the volume made up to 200 ml. with water. Three grams of a 48% emulsion of methyl salicylate is added. A wet-out skein of polyester is added. The skein is dyed for one hour at 200° F. It is then washed with water and soaped at the boil in a solution containing 0.1% neutral soap and 0.1% soda ash. The skein is rinsed with water and dried. Results are as follows:

|  | Sublimation fastness* |
|---|---|
| Cis 2-cyanovinyl ester, red-orange of Example 9 | 3–4 |
| Trans 2-cyanovinyl ester, bright red orange of Example 9 | 2–3 |
| Ethyl ester, reddish yellow | 1 |

*Sublimation results are obtained by sandwiching the dyed skein between 80 square cotton and pressing it for 10 seconds at 360° F. Rating is on an ascending scale of 0–5.

EXAMPLE 11

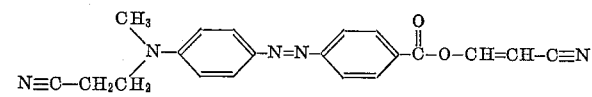

To 75 ml. of dimethylformamide is added 6 grams of the monoazo dye p-(4-N-methyl-N-cyanoethylaminophenylazo)benzoic acid, 6 ml. of 3-chloroacrylonitrile and 6 ml. of triethylamine. The mixture is stirred without temperature control until the reaction is complete. The solution of esterified dye obtained is clarified by filtration and diluted with water. The cyanovinyl ester dye precipitates, is isolated by filtration, and dried.

When dispersed in acetone and dyed using the dyeing method of Example 10, an orange shade is obtained on polyester fibers.

I claim:
1. A compound of the formula:

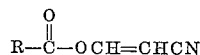

wherein R is the residue of a carboxylic acid selected from the group consisting of
  (a) 1-aminoanthraquinone-2-carboxylic acid,
  (b) 1-phenylpyrazolin-5-one-3-carboxylic acid,
  (c) p-dimethylaminophenylazobenzoic acid, and
  (d) N-(2-cyanoethyl)-N-methylphenylazobenzoic acid.
2. The compound 2-cyanovinyl 1-aminoanthraquinone-2-carboxylate.
3. The compound 2-cyanovinyl 1-phenylpyrazolin-5-one-3-carboxylate.
4. The compound 2-cyanovinyl p-(4-dimethylaminophenylazo)-benzoate.

References Cited by the Examiner
UNITED STATES PATENTS 2,266,771  12/1941  Lange et al. _____ 260—465.4
3,097,198   7/1963  Fishwick _____ 260—207.1

OTHER REFERENCES

Joly et al.: "Préparation de dérivés acyloxylés en série stéroïde," in Bulletin Soc. Chem. (France), T24, pp. 330–331 (1957).

Suzuki: "The Mechanism of Solution of Polyacrylonitrile," in Chemical Abstracts, 50, 3848–c–e (1956).

LORRAINE A. WEINBERGER, *Primary Examiner.*

CHARLES B. PARKER, *Examiner.*

R. J. FINNEGAN, H. C. WEGNER,
*Assistant Examiners.*